United States Patent
Sharma et al.

(10) Patent No.: US 10,476,790 B2
(45) Date of Patent: Nov. 12, 2019

(54) SERVICE CHAINING AT A NETWORK DEVICE

(71) Applicant: Cisco Technology, Inc., San Jose, CA (US)

(72) Inventors: Samar Sharma, San Jose, CA (US); Mahadeva Swamy Chandra, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 45 days.

(21) Appl. No.: 15/825,439

(22) Filed: Nov. 29, 2017

(65) Prior Publication Data
US 2018/0176128 A1 Jun. 21, 2018

(30) Foreign Application Priority Data

Dec. 19, 2016 (IN) .............................. 201641043249
Oct. 4, 2017 (IN) .............................. 201741035135

(51) Int. Cl.
*H04L 1/00* (2006.01)
*H04L 12/715* (2013.01)
(Continued)

(52) U.S. Cl.
CPC ............ *H04L 45/64* (2013.01); *H04L 41/082* (2013.01); *H04L 41/0806* (2013.01); *H04L 41/0886* (2013.01); *H04L 41/5051* (2013.01); *H04L 41/5054* (2013.01); *H04L 43/08* (2013.01); *H04L 45/02* (2013.01); *H04L 45/306* (2013.01); *H04L 45/42* (2013.01); *H04L 63/101* (2013.01);
(Continued)

(58) Field of Classification Search
None
See application file for complete search history.

(56) References Cited

U.S. PATENT DOCUMENTS 6,182,097 B1 1/2001 Hansen et al.
8,301,645 B1 10/2012 Crook
(Continued)

OTHER PUBLICATIONS

Zhang, et al., "L4-L7 Service Function Chaining Solution Architecture", Open Networking Foundation, Version 1.0, ONF TS-027, Open Flow, Jun. 14, 2015, 36 pgs.
(Continued)

*Primary Examiner* — Phirin Sam
(74) *Attorney, Agent, or Firm* — Edell, Shapiro & Finnan, LLC

(57) ABSTRACT

In one embodiment, a network device is provided that comprises a plurality of ports at which network packets are received at the network device and sent from the network device. At least hardware module includes one or more memories that store entries for one or more networking features to be performed to direct network packets with respect to the plurality of ports. A processor is coupled to the at least one hardware module and configured to communicate with the at least one hardware module to store in the one or more memories attributes for one or more access control lists and associated actions that cause network packets which are received that match the attributes for the one or more access control lists, to be directed in a service chain that includes one or more network processing appliances connected to one or more of the plurality of ports.

20 Claims, 18 Drawing Sheets

(51) Int. Cl.
*H04L 12/24* (2006.01)
*H04L 12/717* (2013.01)
*H04L 12/751* (2013.01)
*H04L 29/06* (2006.01)
*H04L 12/26* (2006.01)
*H04L 12/725* (2013.01)
*H04L 29/12* (2006.01)
*H04L 12/721* (2013.01)

(52) U.S. Cl.
CPC ............ *H04L 63/104* (2013.01); *H04L 45/66* (2013.01); *H04L 61/20* (2013.01)

(56) References Cited

U.S. PATENT DOCUMENTS

| | | | |
|---|---|---|---|
| 9,178,807 B1* | 11/2015 | Chua | H04L 45/02 |
| 9,258,243 B2 | 2/2016 | Guichard et al. | |
| 9,565,135 B2 | 2/2017 | Li et al. | |
| 9,755,959 B2 | 9/2017 | Guichard et al. | |
| 9,853,898 B1* | 12/2017 | Subramanian | H04L 45/745 |
| 10,108,791 B1* | 10/2018 | Masterman | G06F 21/32 |
| 2005/0027858 A1 | 2/2005 | Sloth et al. | |
| 2009/0198724 A1 | 8/2009 | Valimaki et al. | |
| 2010/0251128 A1 | 9/2010 | Cordasco | |
| 2012/0317276 A1 | 12/2012 | Muniraju | |
| 2013/0298243 A1* | 11/2013 | Kumar | G06F 21/52 726/25 |
| 2015/0355946 A1* | 12/2015 | Kang | G06F 9/5072 718/104 |
| 2016/0212048 A1 | 7/2016 | Kaempfer et al. | |
| 2016/0241436 A1* | 8/2016 | Fourie | H04L 47/2425 |
| 2016/0241491 A1* | 8/2016 | Tripathi | H04L 49/1523 |
| 2016/0261497 A1* | 9/2016 | Arisoylu | H04L 45/74 |
| 2016/0283290 A1* | 9/2016 | Porat | G06F 9/54 |
| 2017/0118088 A1* | 4/2017 | Koizumi | H04L 41/147 |
| 2017/0149632 A1* | 5/2017 | Saltsidis | H04L 41/5054 |

OTHER PUBLICATIONS

Kumbhare, et al., "Opendaylight Service Function Chaining Use-Cases", Ericsson, OpenDaylight SFC Use Cases, Oct. 14, 2014, 25 pgs.

Su, et al., "An OpenFlow-based Dynamic Service Chaining Approach for Hybrid Network Functions Virtualization", Proceedings of the 4th IIAE International Conference on Industrial Application Engineering 2016, DOI: 10.12792/iciac2016.019, The Institute of Industrial Applications Engineers, Japan, Mar. 26-30, 2016, 6 pgs.

Blendin, et al., "Position Paper: Software-Defined Network Service Chaining", European Workshop on Software Defined Networks, Sep. 2014, 6 pgs.

Samar Sharma, "Catena", https://blogs.cisco.com/datacenter/catena, Mar. 27, 2017, 8 pages.

"Cisco Nexus 7000 Series Switches Command Reference: The Catena Solution", Feb. 14, 2017, 48 pages.

"Cisco Nexus 7000 Series Switches Configuration Guide: The Catena Solution", Dec. 21, 2016, 28 pages.

* cited by examiner

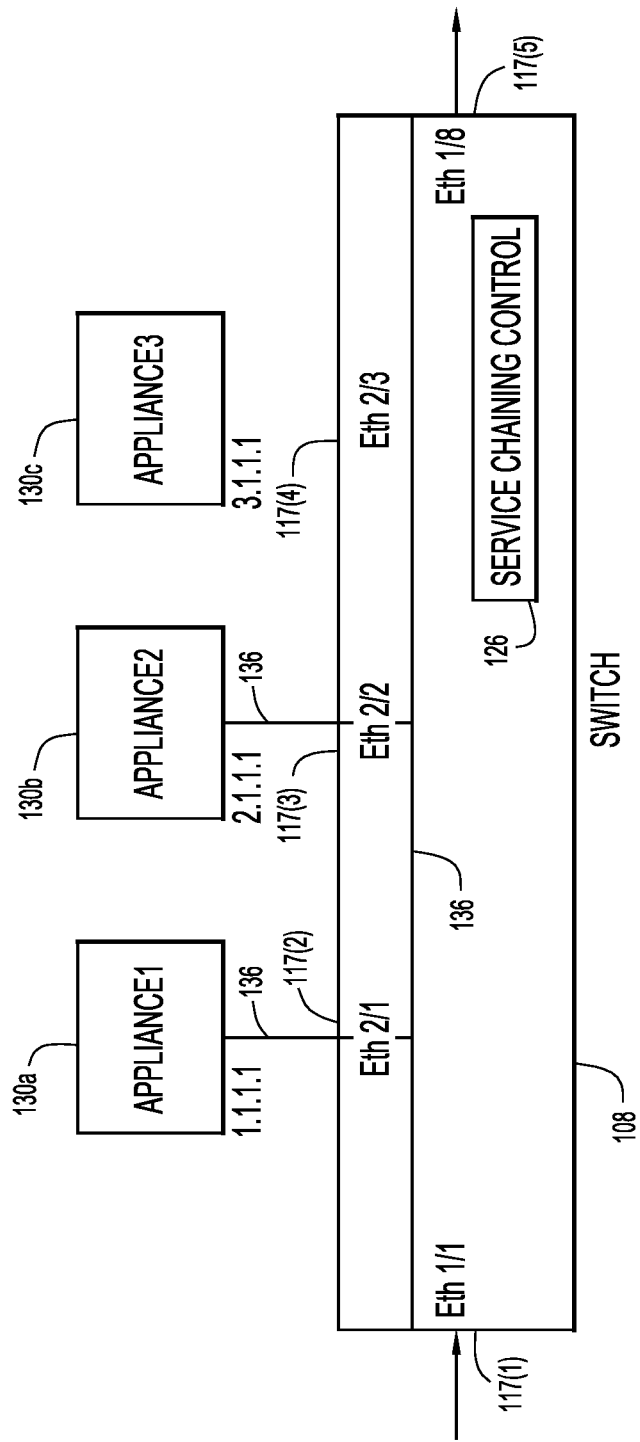

SERVICE CHAINING AT A NETWORK DEVICE

PRIORITY CLAIM

This application claims priority to Indian Application No. 201641043249, filed Dec. 19, 2016, and to Indian Application No. 201741035135, filed Oct. 4, 2017, the entirety of each of which is incorporated herein by reference.

TECHNICAL FIELD

The present disclosure relates to networking and network devices.

BACKGROUND

End users have more communications choices than ever before. A number of prominent technological trends are currently afoot (e.g., more computing devices, more online video services, more Internet video traffic), and these trends are changing the network delivery landscape. One of these trends is service chaining. Service chaining is an emerging set of technologies and processes that enable operators to configure network services dynamically in software without having to make changes to the network at the hardware level.

BRIEF DESCRIPTION OF THE DRAWINGS

FIGS. 3A-3D are diagrams of a network device configured to perform service chaining in a Layer 3 (L3) or routed mode, according to an example embodiment.

DESCRIPTION OF EXAMPLE EMBODIMENTS

Overview

In one embodiment, a network device is provided that comprises a plurality of ports at which network packets are received at the network device and sent from the network device. At least hardware module includes one or more memories that store entries for one or more networking features to be performed to direct network packets with respect to the plurality of ports. A processor is coupled to the at least one hardware module and configured to communicate with the at least one hardware module to store in the one or more memories attributes for one or more access control lists and associated actions that cause network packets which are received that match the attributes for the one or more access control lists, to be directed in a service chain that includes one or more network processing appliances connected to one or more of the plurality of ports.

Example Embodiments

Presented herein are techniques for service chaining without any additional packet headers. These techniques utilize hardware already found on network devices, and thus do not use or rely on proprietary or other types of packet headers or any additional special hardware. This allows for health monitoring and automatic failure handling and transparent insertion of appliances (configurations not required) with wire-speed performance. These techniques may be implemented on existing Application Specific Integrated Circuits (ASICs) and linecards in datacenter switches, for example, and allow for selective traffic redirection based on access control list (ACL) configuration. For example, if traffic matches an entry in an ACL, that traffic may be forwarded as indicated in the ACL, e.g., to an application configured to provide one or more network services.

Figure 1:
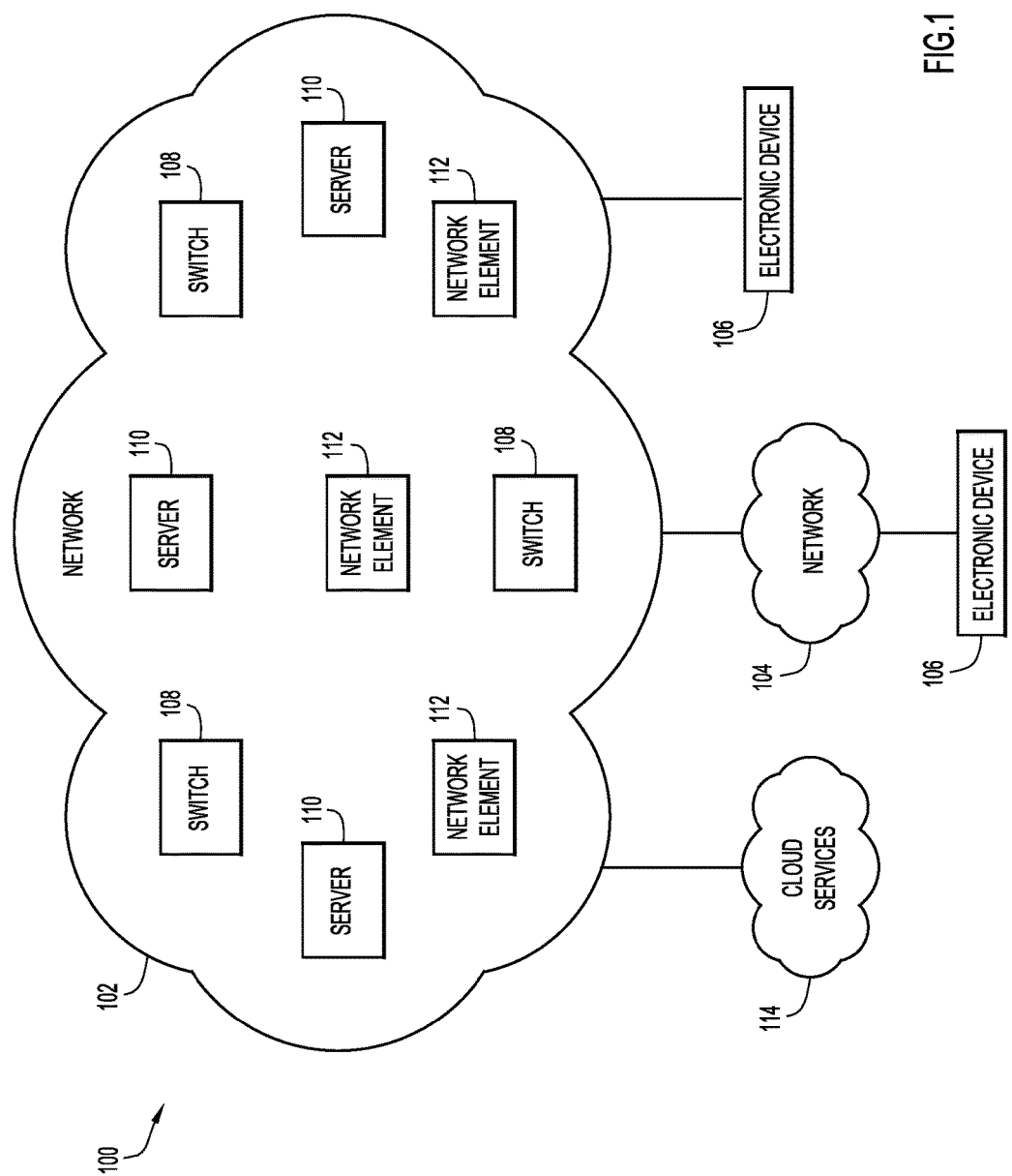
FIG. 1 is a diagram of a communication system that includes a network in which one or more network devices are configured to perform service chaining, according to an example embodiment.

Turning to FIG. 1, a simplified block diagram of a communication system 100 is shown. Communication system 100 includes a network 102, a secondary network 104, a plurality of electronic devices 106, and cloud services 114. Network 102 includes a plurality of switches 108, a plurality of servers 110, and a plurality of network elements 112.

Generally, communication system 100 can be implemented in any type or topology of networks. Network 102 represents a series of points or nodes of interconnected communication paths for receiving and transmitting packets of information that propagate through communication system 100. Network 102 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication. Network 102 offers a communicative interface between nodes, and may be configured as a LAN, wireless LAN, home area network (HAN), near-me area network (NAN), personal area network (PAN), or some other similar network.

In communication system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof. Additionally, radio signal communications over a cellular network may also be provided in communication systems 100. Suitable interfaces and infrastructure may be provided to enable communication with the cellular network.

The term "packet" as used herein, refers to a unit of data that can be routed between a source node and a destination node on a packet switched network. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

In an example implementation, switches 108, servers 110, and network elements 112 are network elements, which are meant to encompass network appliances, servers, routers, switches, gateways, bridges, load balancers, processors, modules, or any other suitable device, component, element, or object operable to exchange information in a network environment. Network elements may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with communication system 100, switches 108, servers 110, and network elements 112 are network elements can include memory elements for storing information to be used in the operations outlined herein. Switches 108, servers 110, and network elements 112 are network elements may keep information in any suitable memory element (e.g., random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in communication system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of communication system 100, such as switches 108, servers 110, and network elements 112 are network elements can be configured to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, switches 108, servers 110, and network elements 112 are network elements may include a processor that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Figure 2A:
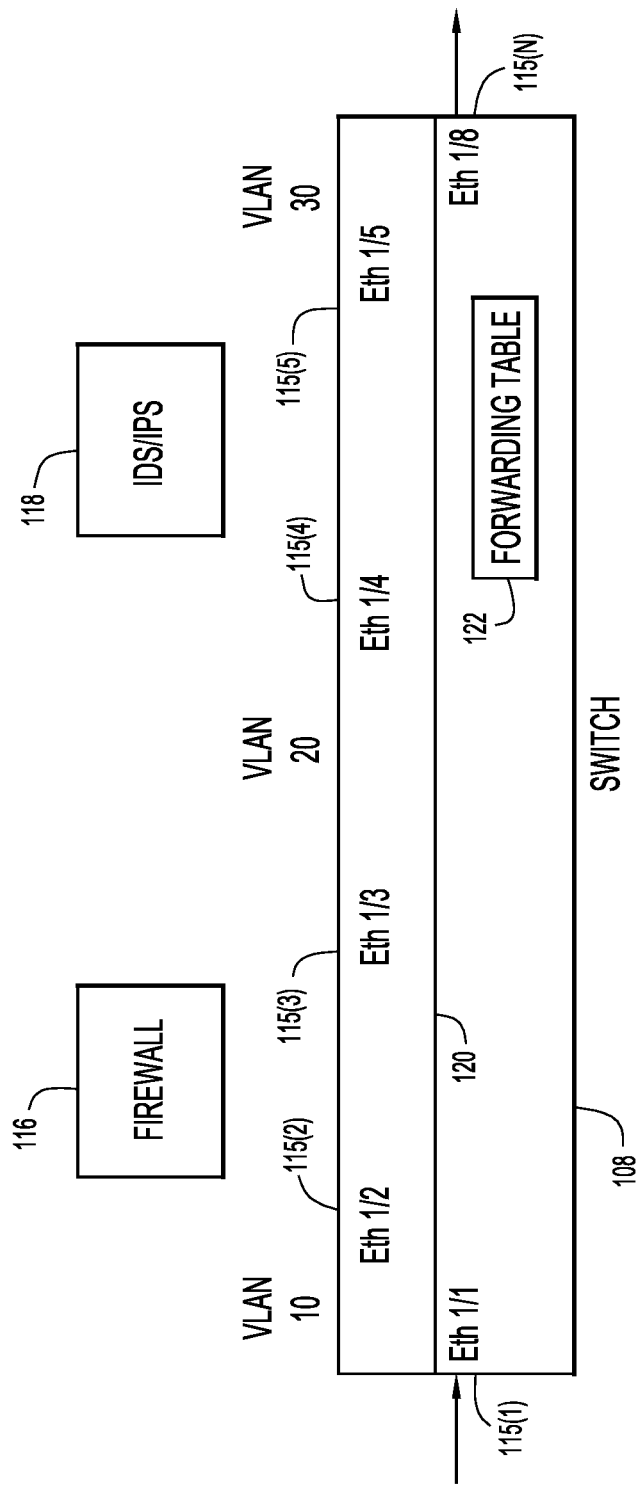
FIGS. 2A-2C are diagrams of a network device configured to perform service chaining in a Layer 2 (L2) or transparent mode, according to an example embodiment.

Turning to FIG. 2A, a simplified block diagram illustrating one possible set of details associated with an existing communication system 100. In FIG. 2A, data to switch 108 may be routed using a forwarding table 122 maintained by the switch 108. Forwarding table 122 causes data to follow data path 120. FIG. 2A illustrates a conventional switching function, where the traffic enters the switch 108 at an ingress port 115(1) (labeled Eth 1/1) and departs the switch from an egress port 115(N) (labeled Eth 1/8). There are several other ports on the switch, shown at 115(2) (Eth 1/2), 155(3) (Eth 1/3), 115(4) (Eth 1/4) and 115(5) (Eth 1/5) that are bypassed by the path 120 of the traffic in this example. Furthermore, FIG. 2A shows that a first virtual local area network (VLAN) denoted VLAN 10 may be configured on port 115(2), a second VLAN denoted VLAN 20 configured on port 115(3) and a third VLAN denoted VLAN 30 configured on port 115(5). Furthermore, FIG. 2A shows that there are two network appliances or applications: a firewall 116 and an Intrusion Detection System/Intrusion Prevention System (IDS/IPS) 118. However, in the example of FIG. 2A, traffic is not being directed to either of the network appliances/applications 116 and 118.

Figure 2B:
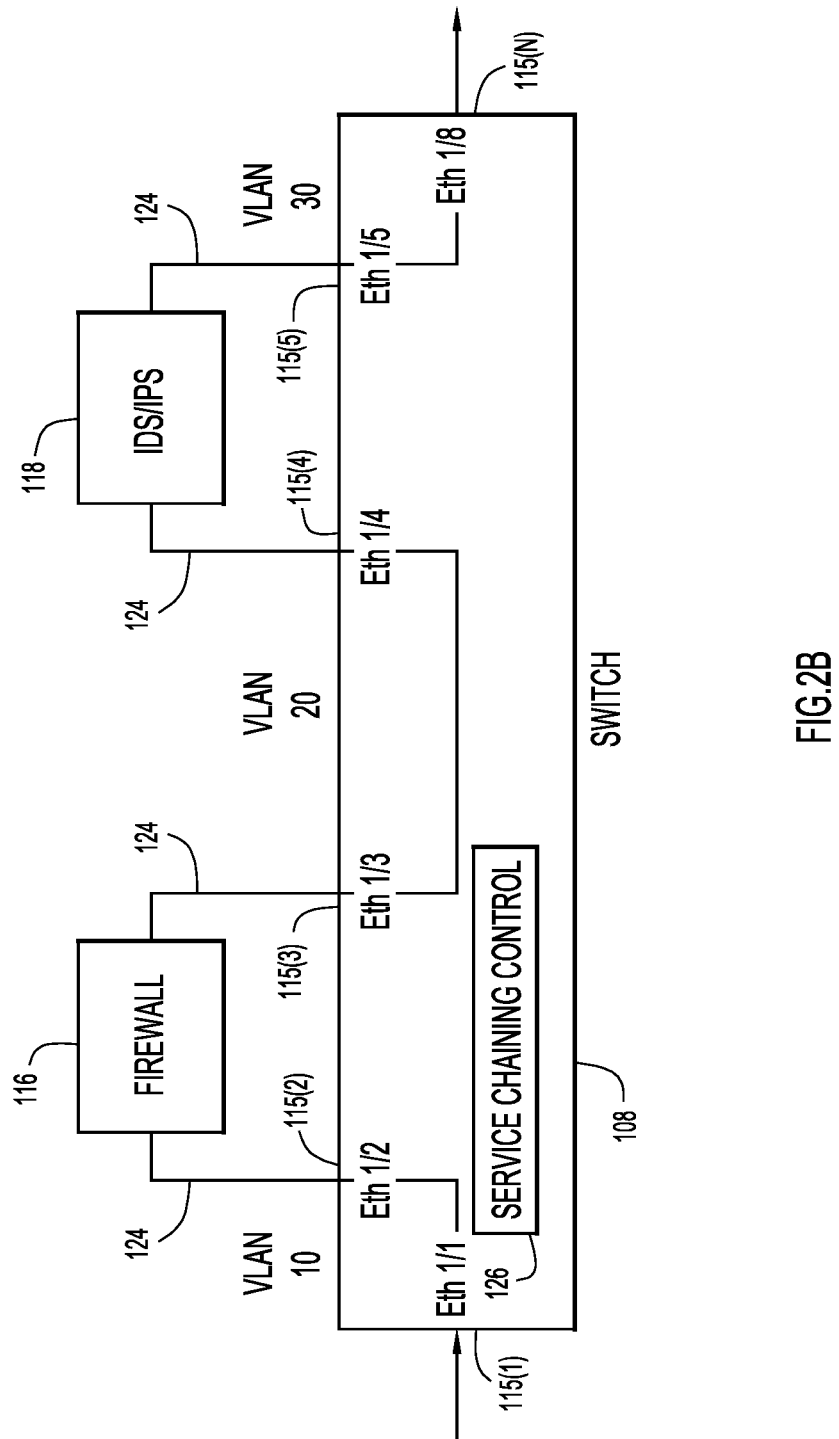

Turning now to FIG. 2B, a simplified diagram is shown by switch 108 is configured to perform service chaining according to one embodiment. FIG. 2B shows an example service chain that uses a Layer 2 (L2) mode. L2 mode may also be referred to as "transparent mode" or "bump in the wire mode" because no information in the packet (Media Access Control (MAC) address, Internet Protocol (IP) address, etc.) is rewritten.

The applications 116 and 118 may be configured to perform a network service function, and the switch may be configured to forward network traffic to one or more of the applications by the service chaining control function 126 configured on the switch 108.

In an example, the switch 108 can direct traffic along path 124 using access control list 126 that passes the traffic through firewall 116 and then through IDS/IPS 118. If the traffic matches an entry in an access control list configured by the service chaining control function 126 then the data is forwarded as configured by the service chaining control function 126 through firewall 116 and IDS/IPS 118.

More specifically, traffic that matches parameters configured by the service chaining control function 126 entering the switch at ingress port 115(1) is directed to port 115(2) on VLAN—where it is directed to firewall 116 and returns from the firewall 116 to port 115(3) on the switch, and then is directed to port 115(4) on the switch to the IDS/IPS 118 and returns from the IDS/IPS 118 to port 115(5) on the switch. Ultimately, the traffic leaves the switch via port 115(N).

An L2 service chain has elements that are specified in a set of port groups (i.e., a list of interfaces). An example port group is:
port-group pg 11
  interface eth 1/2
  interface eth 1/3
  interface eth 1/4
  interface eth 1/5

In the example of FIG. 2B, there are two port groups, each containing one application or appliance. Firewall 116 is specified by eth 1/2 (egress from switch) and eth 1/3 (ingress to switch) and IDS/IPS 118 is specified by eth 1/4 (egress from switch) and eth 1/5 (ingress to switch).

In other words, in transparent (L2) mode, the switch 108 is configured to store in one or more hardware memories attributes for one or more access control lists in order to cause packets that match the attributes for the one or more access control lists to be directed to a first port that is connected to a first network processing appliance and returned to the network device at a second port that is connected to the first network processing appliance, and subsequently directed to a third port that is connected to a second network processing appliance and returned to the network device at a fourth port that is connected to the second network processing appliance, and so on.

Figure 2C:
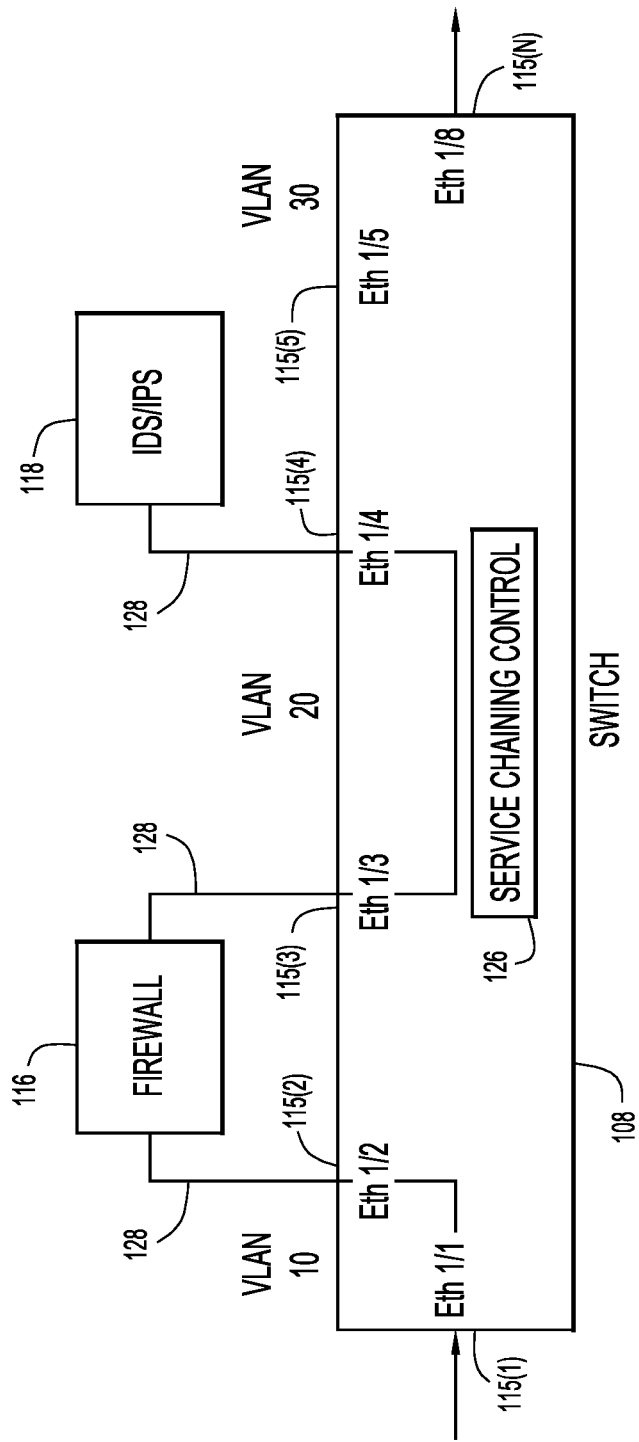

Turning to FIG. 2C, a diagram is shown that is similar to that of FIG. 2B, with some exceptions. Service chaining control function 126 directs the traffic to take path 128 and go through firewall 116 and IDS/IPS 118. In one example, IDS/IPS 118 may block the data and not allow the data to exit switch 108. If firewall 116 fails to identify and drop bad packets, then signature algorithms of IDS/IPS 118 can identify and drop the bad traffic and generate an alert.

FIGS. 3A-3D illustrate another example of how service chaining may be performed in a Layer 3 (L3) mode. The L3 mode may also be referred to as "routed mode" because the MAC address in the packet is rewritten in order to direct the packets from one hop to the next through the service chain.

Figure 3A:
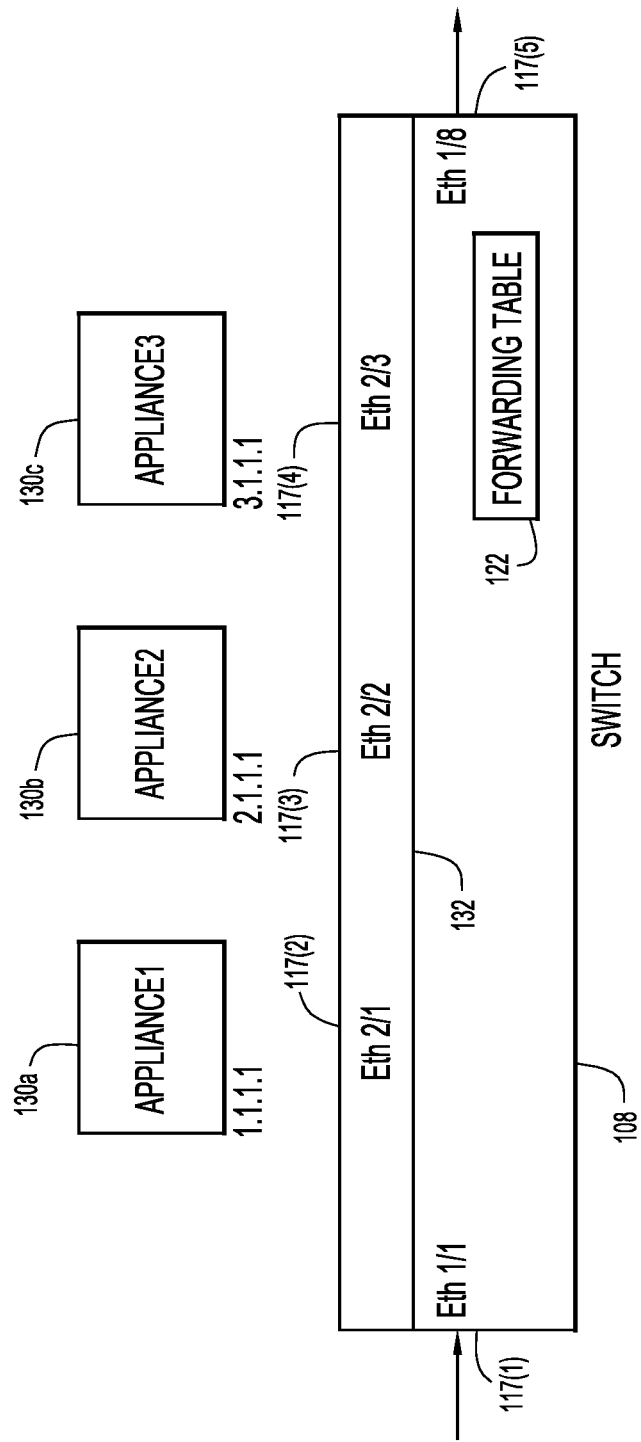

Turning to FIG. 3A, a switch 108 is shown and three network function appliances 130a, 130b and 130b. Switch 108 has ports or interfaces 117(1), 117(2), 117(3), 117(4) and 117(5). In an example, traffic to switch 108 may be routed using forwarding table 122. Forwarding table 122 causes traffic to follow data path 132 through the switch and bypassing appliances 130a-130c. In the example shown, appliance 130a is reachable at IP address 1.1.1.1, appliance 130b is reachable at IP address 2.1.1.1 and appliance 130c is reachable at IP address 3.1.1.1.

Figure 3B:
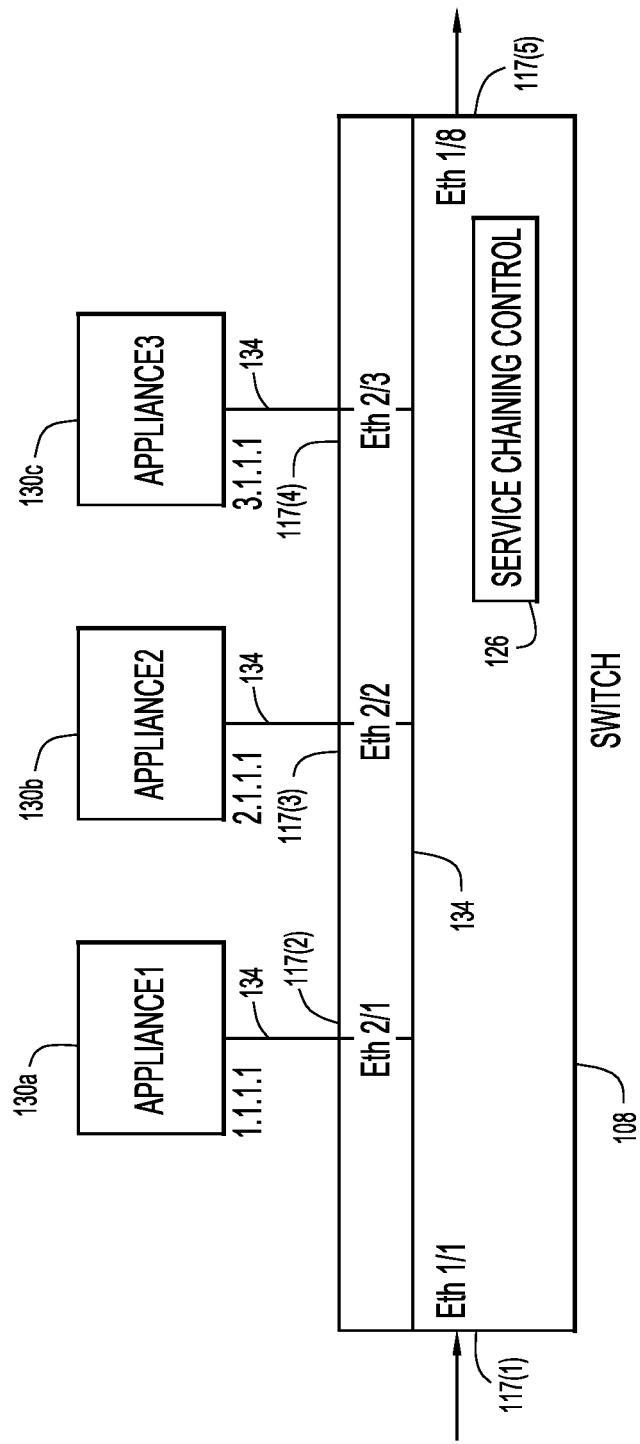

FIG. 3B shows switch 108 can routed traffic through a service chain consisting of appliances 130a-130b using access control list 126. The service chaining control function 126 directs the traffic to take path 134 and go through each appliance 130a-130c. Appliances 130a-130c may be a firewall, Intrusion Prevention System (IPS), Intrusion Detection System (IDS), Wide Area Application Services (WAAS), Web Application Firewall (WAF), network monitoring devices, etc.

An L3 chain has elements that are specified in a set of device groups. An example device group is:
device-group dg 11
  node ip 1.1.1.1
  node ip 2.1.1.1
  node ip 3.1.1.1

In the example of FIG. 3B, there are three device groups, each containing one application. Application 1 is specified by IP address 1.1.1.1; application 2 is specified by IP address 2.1.1.1; and application 3 is specified by IP address 3.1.1.1.

FIG. 3C shows another example of a service chain where traffic takes path 136 through appliance 130a and appliance 130b, but not appliance 130c.

Figure 3D:
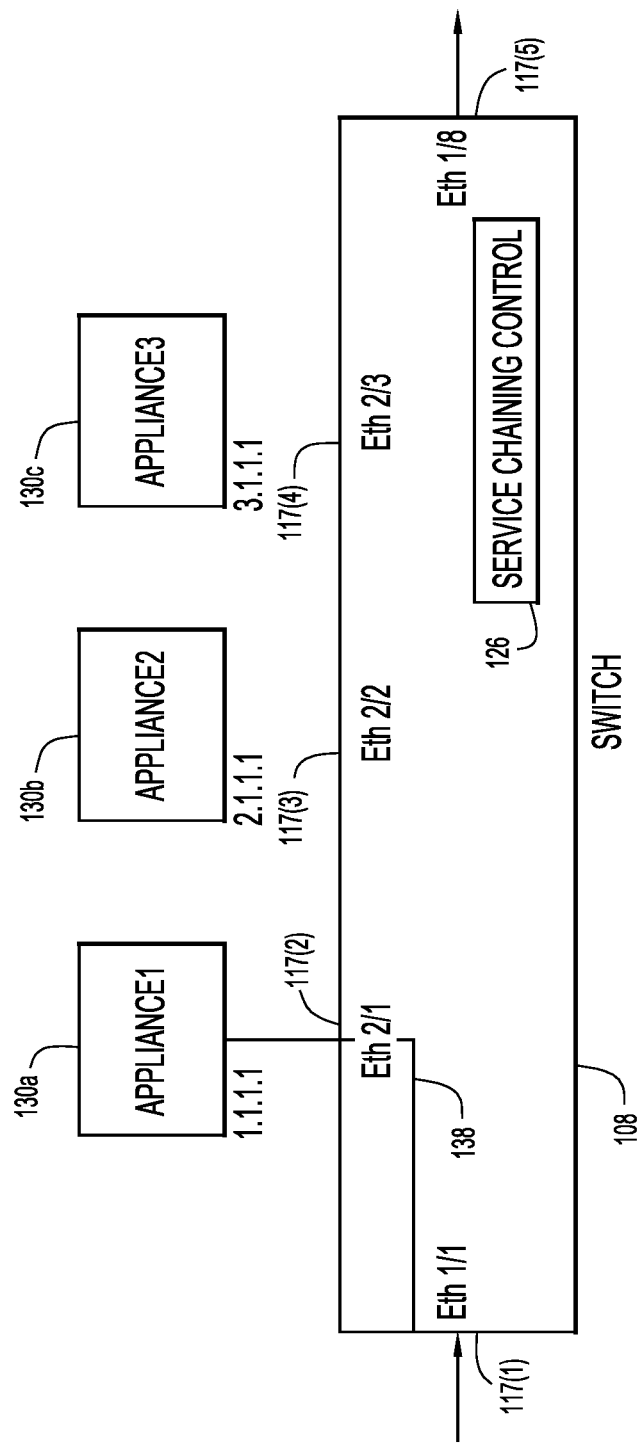

FIG. 3D shows yet another example in which appliance 130a may block the traffic and not allow the data to exit switch 108. Some of the reasons the traffic may be blocked is suspicious packets or other reasons.

Figure 4:
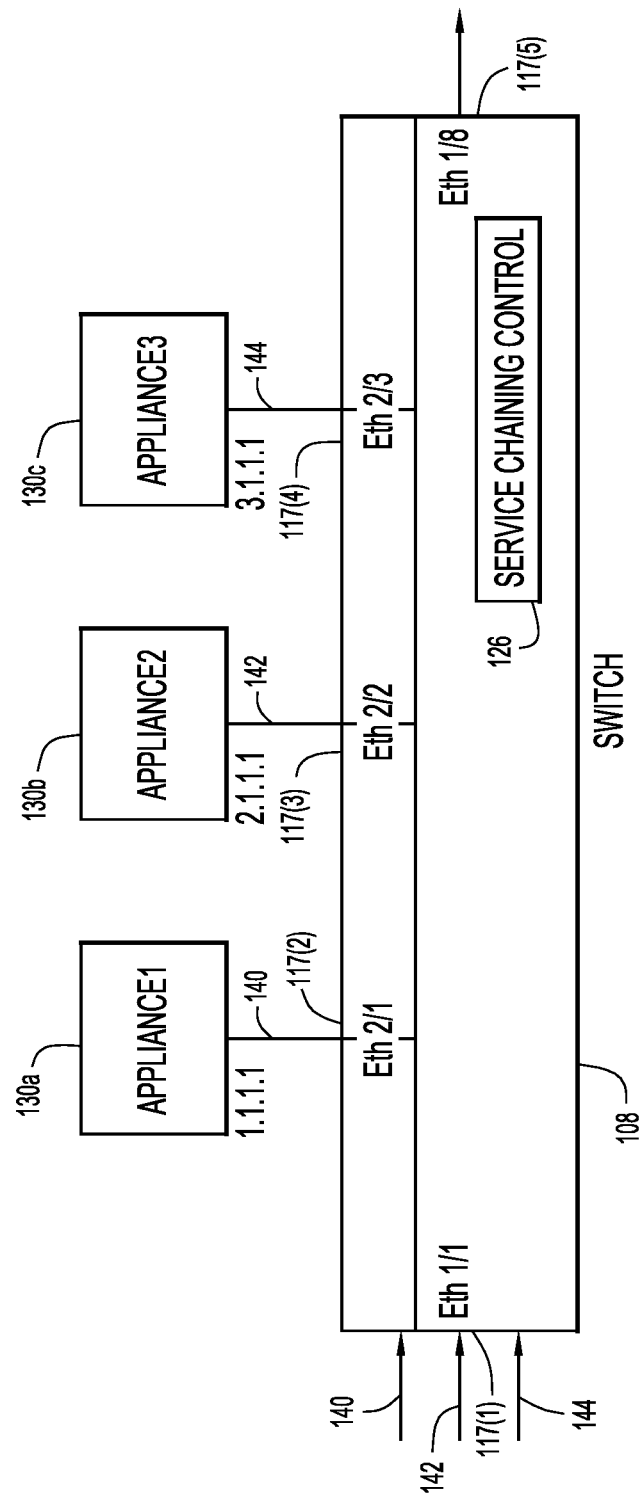
FIG. 4 is a diagram of a network device configured to load balance traffic to different instances of a network processing appliance using the service chaining techniques, according to an example embodiment.

Reference is now made to FIG. 4. FIG. 4 illustrates an example in which the switch 109 can use the service chaining control function 126 to load balance traffic when traffic is directed through a service chain in the routed or L3 mode. Traffic may each be sent to a different appliance. For example, traffic may be sent to appliance 130a on path 140, traffic may be sent to appliance 130b on path 142, and traffic may be sent to appliance 130c on path 144. Appliances 130a-130c may be similar to one element of a chain. This is similar to a cluster where traffic is equally distributed among the appliances 130a-130c.

Communication system 100 allows for hardware based redirecting and service chaining, redirect line-rate traffic to multiple network service appliances, for example Firewall, Intrusion Prevention systems, IDS, DOS Protection. Communication system 100 also allows health monitoring and automatic failure handling and transparent insertion of appliances (configurations not required) with wire-speed performance. The system can work on most existing ASICs and linecards and allows for selective traffic redirection—based on ACLs configuration.

Figure 5:
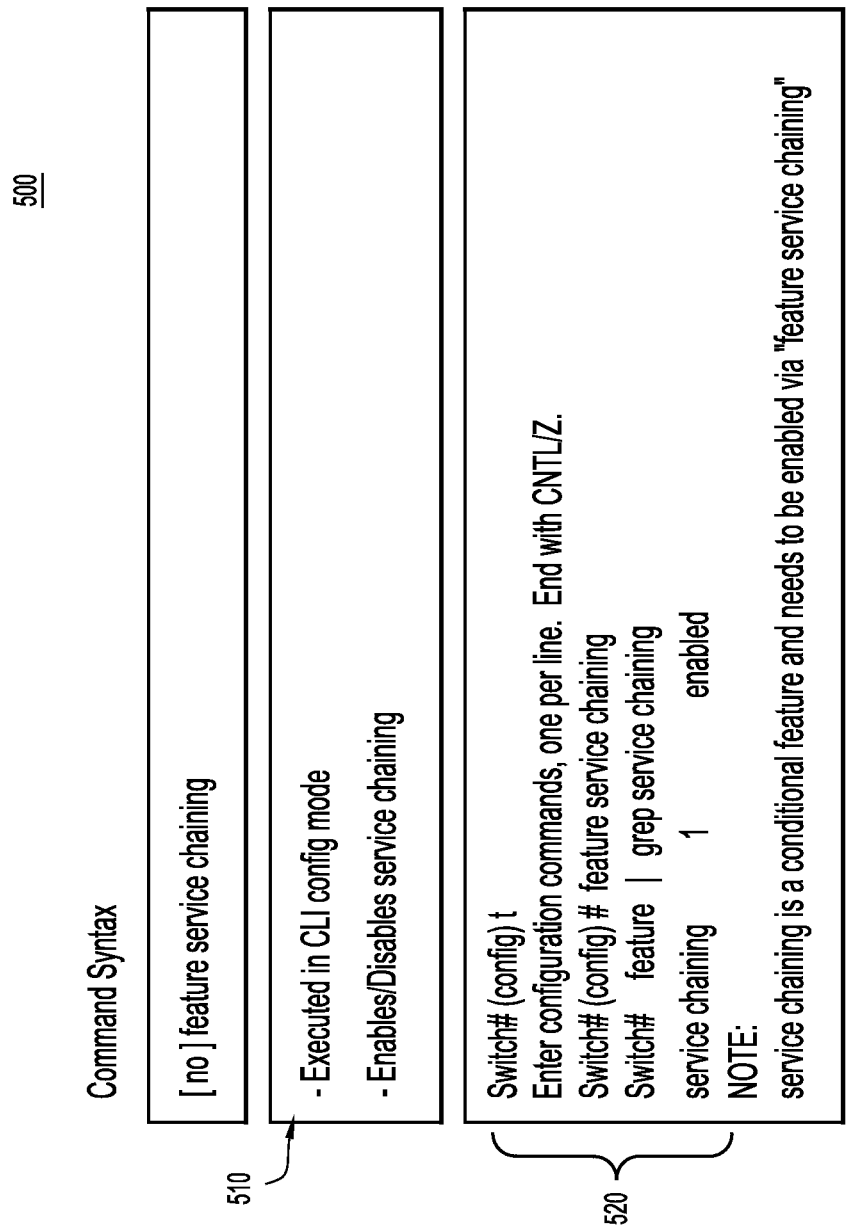
FIG. 5 is a diagram illustrating command syntax to enabling service chaining on a network device, according to an example embodiment.

FIG. 5 shows an example of the command syntax 500 for enabling and configuring the service chaining function on a switch. This command syntax may be executed in a common line interface (CLI) configuration mode to enable/disable the service chaining feature/function, as shown at 510. At 520, examples of the syntax for enabling and configuring service chaining on a switch is described. Thus, FIG. 5 depicts how to enable the service chaining feature on a switch. A user types a command line interface (CLI) command "feature service chaining". The system then checks if the customer has installed the appropriate license. If the license is installed (or if there is a grace period or the license is honor-based) then the service chaining feature becomes operational.

Figure 6:
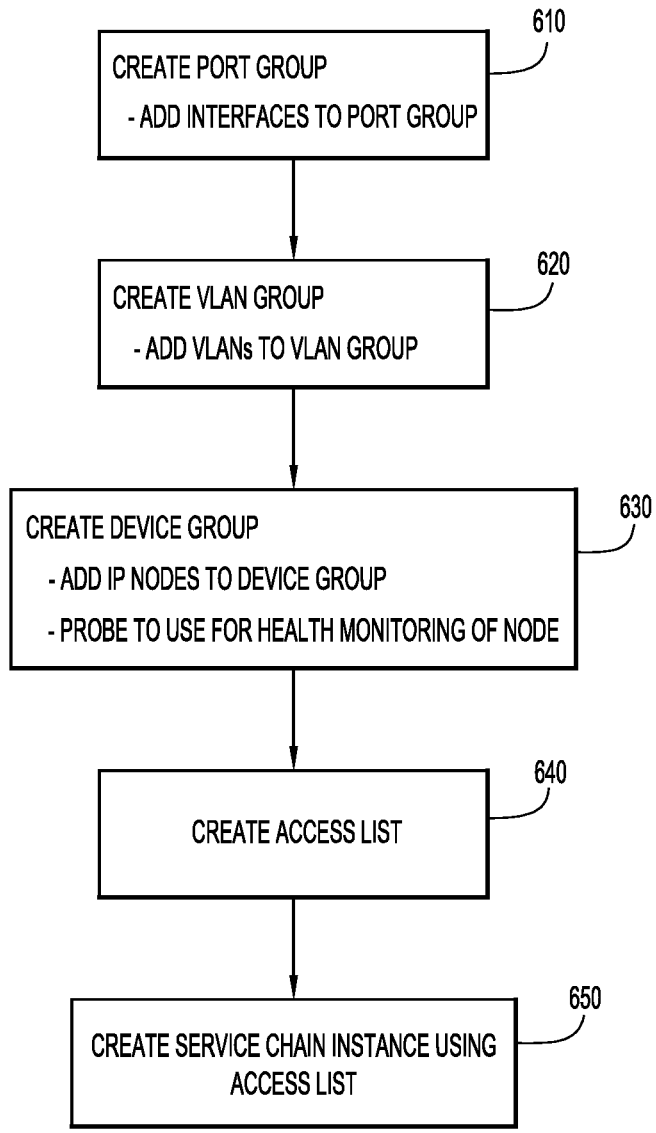
FIG. 6 is a diagram illustrating at a high level, operations for instantiating a service chain on a network device, according to an example embodiment.

FIG. 6 shows a flow chart of a method 600 for configuring service chaining on a switch. At 610, a port group is created, and interfaces are added to the port group. This step may be repeated for each of a plurality of port groups. At 620, a VLAN group is created, and VLANs are attached to the VLAN group. Again, this step may be repeated for each of a plurality of VLAN groups. At 630, a device group is created. IP nodes are added to the device group. The IP nodes may be probed for health monitoring. At 640, an access list is created. At 650, a service chain instance is created using the access list.

Figure 7:
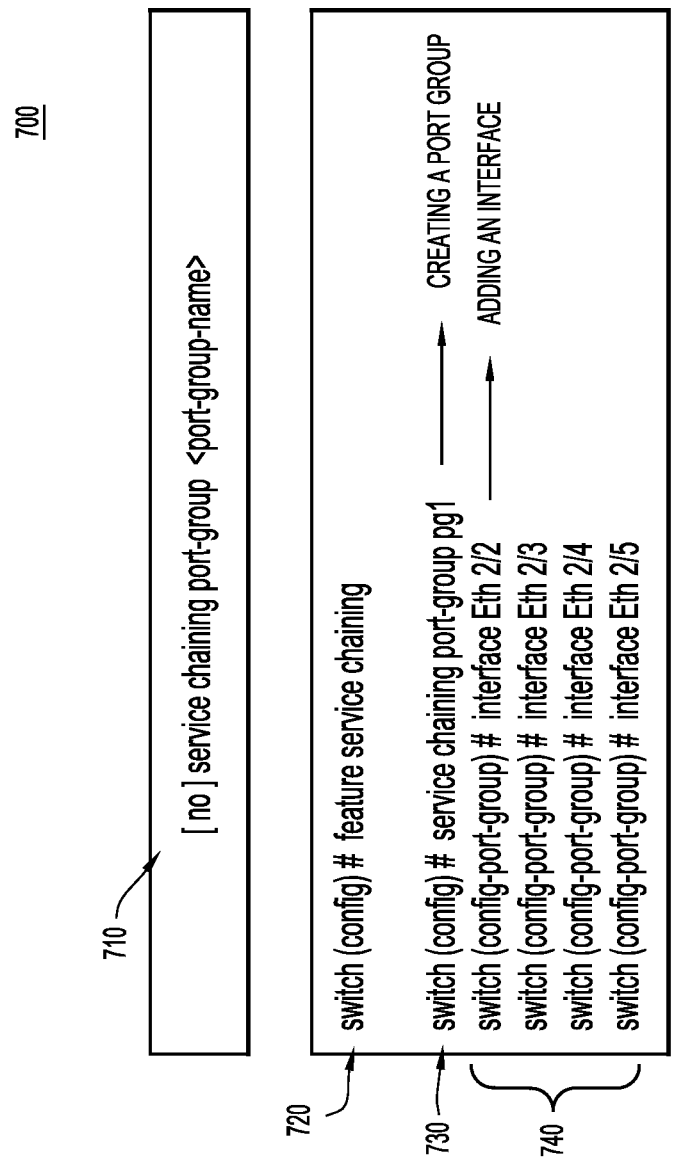
FIG. 7 is a diagram illustrating syntax for defining a port group on a network device, according to an example embodiment.

FIG. 7 is illustrates example syntax 700 for configuring a port group. Service chaining using port groups is enabled by command 710, also by which a port group name is assigned. Command 720 identifies the switch on which service chaining is enabled. The command to create a port group, pg1, is shown at 730 "switch(config)# service chaining port-group pg1". Adding interfaces to the port group pg1 is shown by the commands at 740, e.g., "switch(config-port-group)# interface Eth 2/2."

Figure 8:
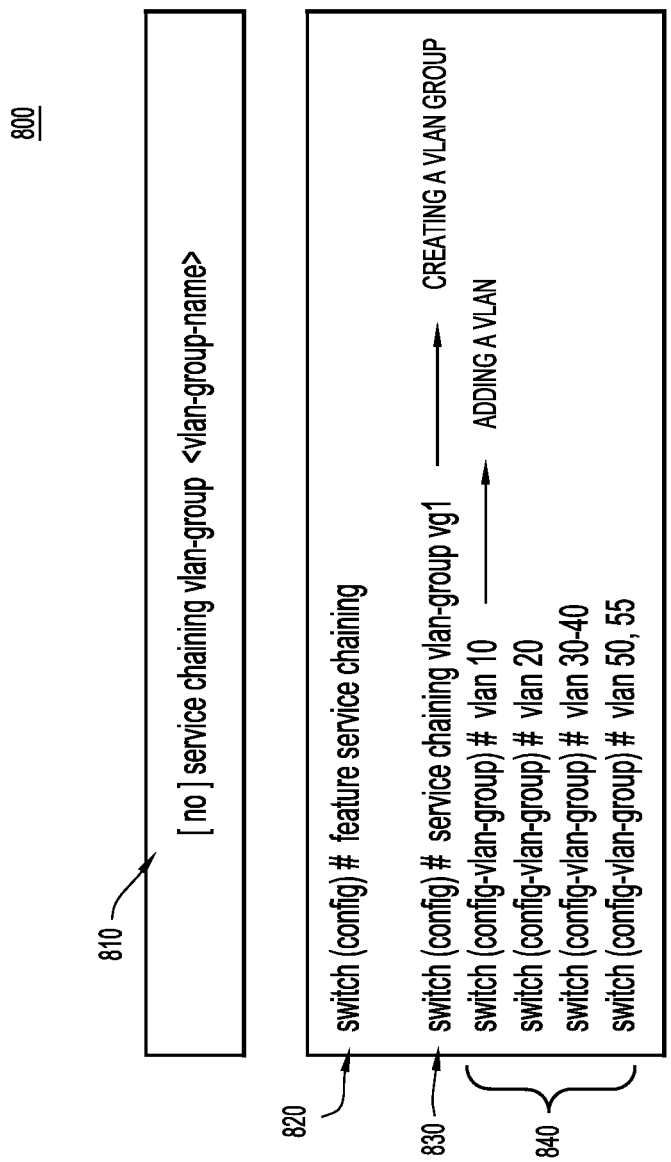
FIG. 8 is a diagram illustrating syntax for defining a virtual local area network group on a network device, according to an example embodiment.

FIG. 8 illustrates example syntax 800 for configuring a VLAN group. Service chaining using port groups is enabled by command 810, also by which a VLAN group name is assigned. Command 820 identifies the switch on which service chaining is enabled. The command to create a VLAN group vg1 is shown at 830 "switch(config)# service chaining vlan-group vg1." Adding VLANs to the VLAN group vg1 is shown by the commands at 840, e.g., "switch(config-vlan-group)# vlan 10."

Figure 9:
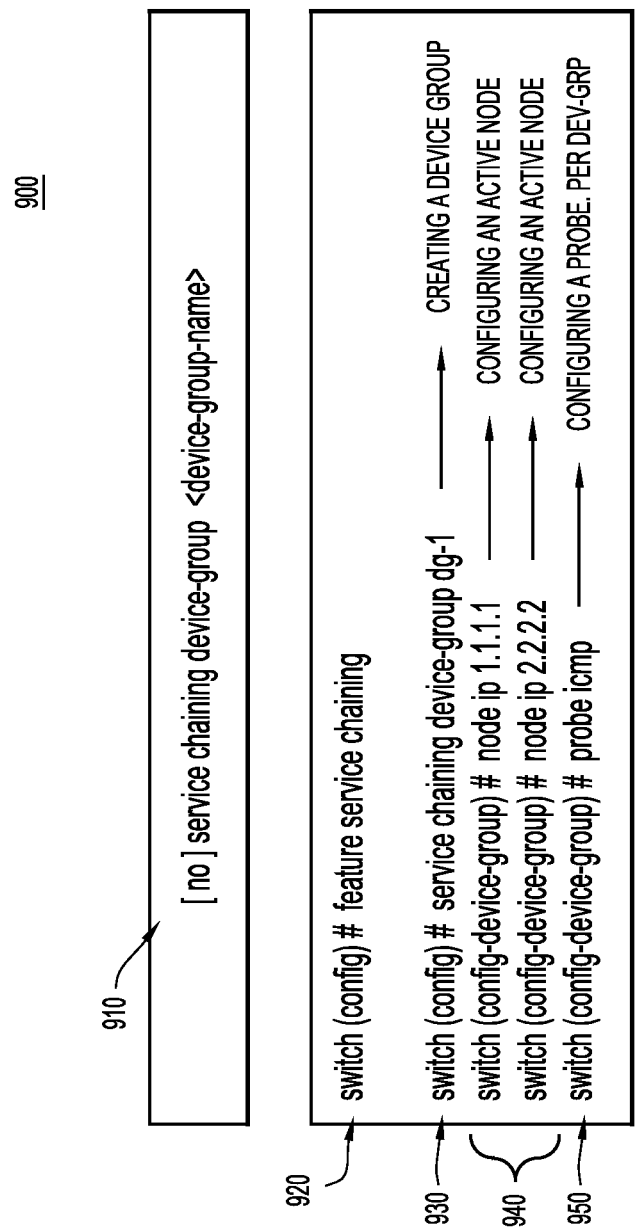
FIG. 9 is a diagram illustrating syntax for defining a device group on a network device, according to an example embodiment.

FIG. 9 illustrates example syntax 900 for configuring a device group. A device group contains node IP addresses and a probe for health monitoring of nodes. Service chaining using port groups is enabled by command 910, also by which a VLAN group name is assigned. If there are multiple nodes, then service chaining will also involve load-balancing the traffic. Command 920 identifies the switch on which service chaining is enabled. Command 930 creates a device group, dg-1. Configuring an active node is shown by the commands at 940, e.g., "switch(config-device-group)# node ip 1.1.1.1." Configuring a probe per device group is shown at command 950.

The following is an example of the commands to create a transparent (L2) mode service chain instance on a switch.

```
switch(config)# service chaining instance1
switch(config-service chaining-instance)# ?
    chain    Chain for instance
    shutdown
switch(config- service chaining)# chain ?
    <0-2147483647>          Chain ID
switch(config- service chaining)# ?
    <1-4294967295>          Sequence number
switch(config- service chaining)# 10 ?
    access-list             ACL list
switch(config- service chaining)# 10 access-list acl10 ?
    ingress-port-group   Specify ingress port group name for ACL rule
    vlan-group  Specify vlan group name for ACL rule
switch(config- service chaining)# 10 access-list acl10 vlan-group vg1 ?
    egress-port-group    Specify egress port group name for ACL rule
    egress-device-group  Specify egress device group name for ACL rule
switch(config- service chaining)# 10 access-list acl10 vlan-group vg1
egress-port-group pg1 ?
    <CR>
    mode        Failure mode
switch(config- service chaining)# 10 access-list acl10 vlan-group vg1
egress-port-group pg1
mode ?
    drop
    forward
    redirect
```

The following is an example of the commands to create a routed (L3) mode service chain on a switch.

```
switch(config)# service chaining instance2
switch(config-service chaining -instance)# ?
    chain    Chain for instance
    shutdown
switch(config-service chaining)# chain ?
    <0-2147483647>          Chain ID
switch(config-service chaining)# ?
    <1-4294967295>          Sequence number
switch(config-service chaining)# 10 ?
    access-list             ACL list
switch(config-service chaining)# 10 access-list acl10 ?
    ingress-port-group   Specify ingress port group name for ACL rule
    vlan-group  Specify vlan group name for ACL rule
switch(config-service chaining)# 10 access-list acl10 ingress-port-group pg1 ?
    egress-port-group    Specify egress port group name for ACL rule
    egress-device-group  Specify egress device group name for ACL rule
switch(config-service chaining)# 10 access-list acl10 ingress-port-group pg1 egress-device-
group dg1 ?
    <CR>
    mode        Failure mode
switch(config-service chaining)# 10 access-list acl10 ingress-port-group pg1 egress-device-
group dg1 mode ?
    drop
    forward
    redirect
```

Figure 10:
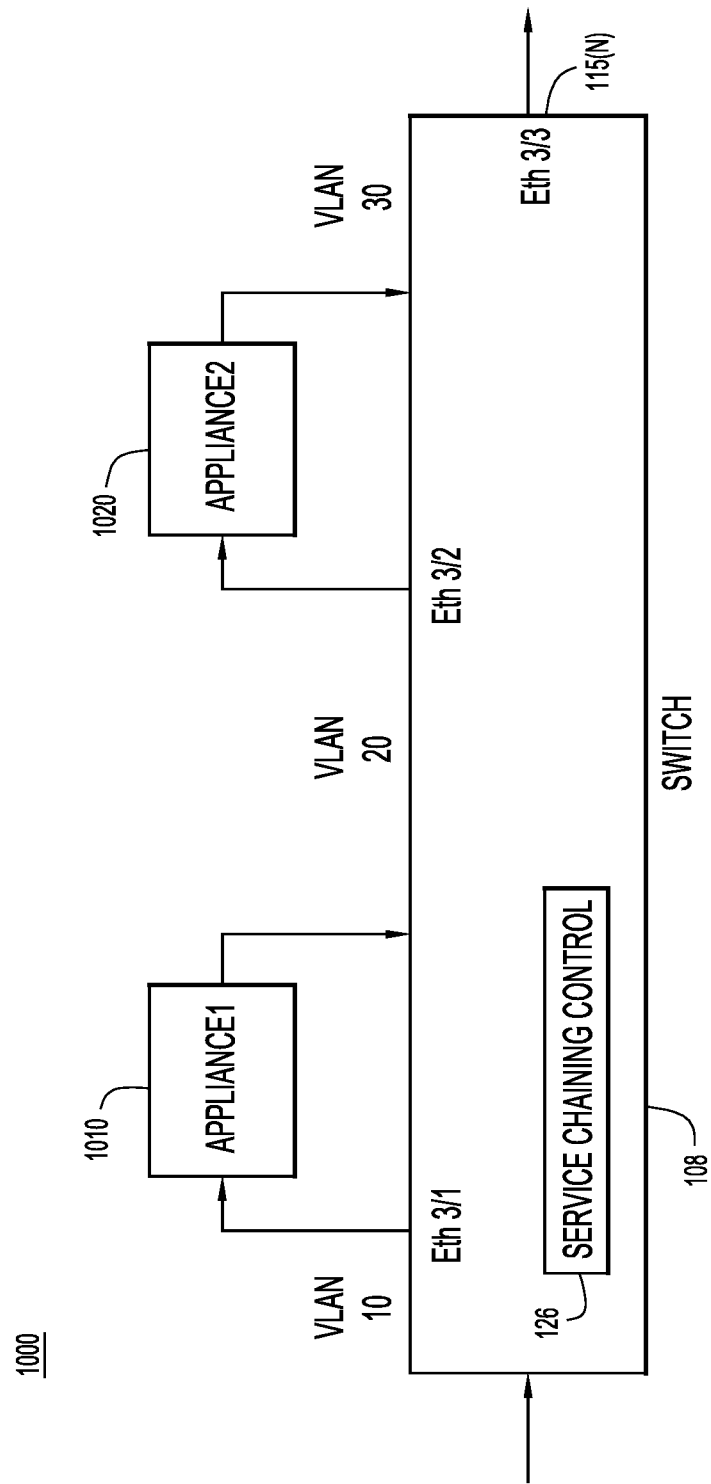
FIG. 10 is a diagram of a network device in which a L2 mode service chain is configured on a network device, according to an example embodiment.

FIG. 10 illustrates another example of a transparent (L2) mode service chain 1000 created on a switch 108 according to the techniques presented herein. Three VLANs are configured on the switch 108: VLAN 10, VLAN 20 and VLAN 30. The switch 108 is connected to two appliances, Appliance1 at 1010 and Appliance2 at 1020. The service chaining control function 126 is configured to create transparent service chain 1000 on the switch 108 and as a result switch 108 directs traffic received at switch 108 to Appliance1 1010, back to the switch 108, and then to Appliance2 1020 and back to the switch 108, and then finally out from the switch 108.

An example of the configuration commands to configure the L2 mode service chain shown in FIG. 10 is listed below.

```
Switch(config)# feature service chaining
Switch(config)# service chaining port-group pg1
Switch(config-port-group)# interface Eth 3/1
Switch(config)# service chaining port-group pg2
Switch(config-port-group)# interface Eth 3/2
Switch(config)# service chaining vlan-group vg1
Switch(config-vlan-group)# vlan 10
Switch(config)# service chaining vlan-group vg2
Switch(config-vlan-group)# vlan 20
Switch(config)# ip access-list acl10
Switch(config-acl)# 10 permit 10.1.1.*/24 any
    Switch(config)# service chaining instance1
    Switch(config-service chaining-instance)# chain 10
    Switch(config-service chaining)# 10 access-list acl10 vlan-group vg1
    egress-port-group pg1
    mode forward
    Switch(config-service chaining)# 20 access-list acl10 vlan-group vg2
    egress-port-group pg2
    mode forward
    Switch(config-service chaining-instance)# no shut
```

Figure 11:
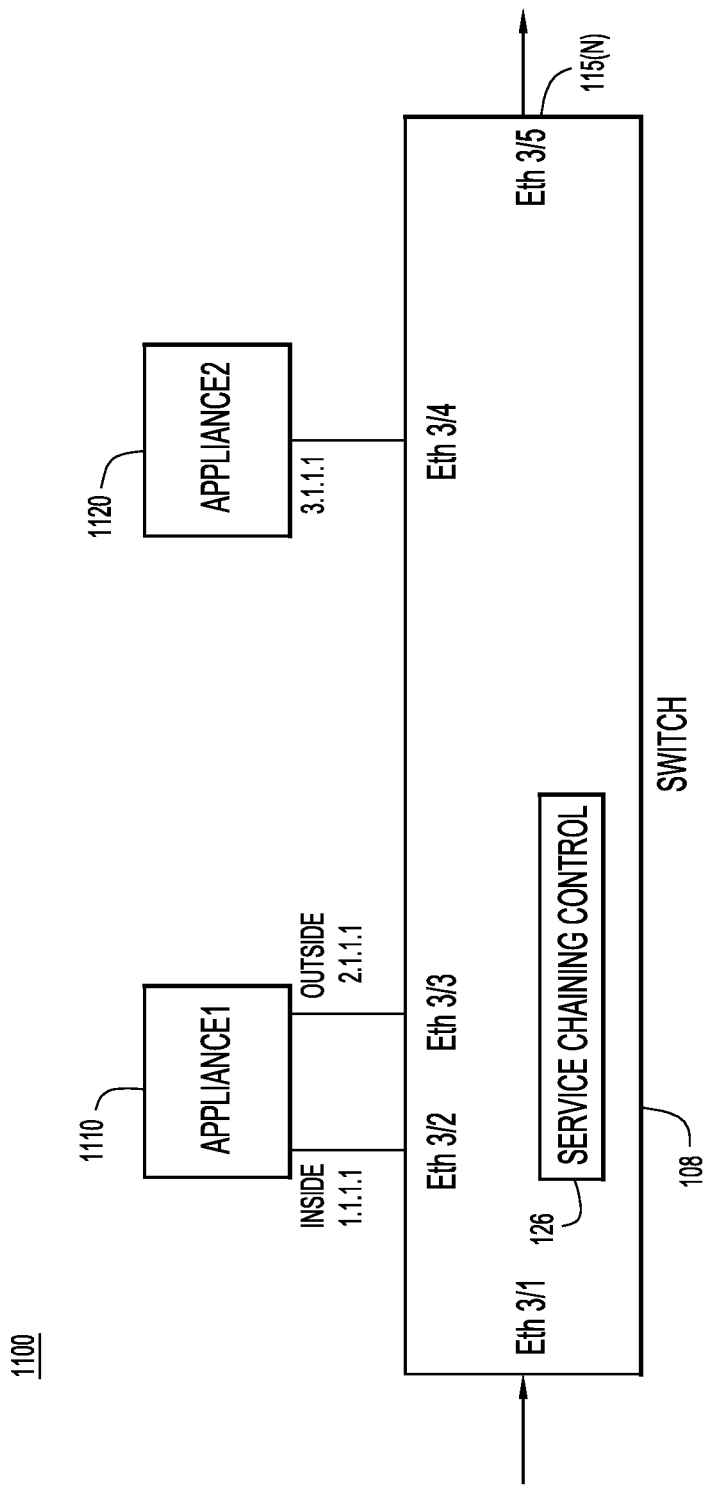
FIG. 11 is a diagram of a network device in which a L3 mode service chain is configured on a network device, according to an example embodiment.

Reference is now made to FIG. 11. FIG. 11 shows an example of a routed (L3) mode service chain 1100 created on a switch 108 according to the techniques presented herein. In this example, service chaining control function 126 is configured to direct traffic to Appliance1 1110 and then to Appliance2 1120.

An example of the configuration commands to configure the L2 mode service chain shown in FIG. 11 is listed below.

```
Switch(config)# feature service chaining
Switch(config)# service chaining port-group pg1
Switch(config-port-group)# interface Eth 3/1
Switch(config)# service chaining port-group pg2
Switch(config-port-group)# interface Eth 3/3
Switch(config)# service chaining device-group dg-1
Switch(config-device-group)# node ip 1.1.1.1
Switch(config-device-group)# probe icmp
Switch(config)# service chaining device-group dg-2
Switch(config-device-group)# node ip 3.1.1.1
Switch(config-device-group)# probe icmp
Switch(config)# ip access-list acl10
Switch(config-acl)# 10 permit 10.1.1.1/24 any
Switch(config)# service chaining instance2
Switch(config-catena-instance)# chain 10
Switch(config-service chaining)# 10 access-list acl10 ingress-port-group pg1 egress-device-
group dg-1 mode forward
Switch(config-service chaining)# 20 access-list acl10 ingress-port-group pg2 egress-device-
group dg-2 mode forward
Switch(config-service chaining-instance)# no shut
```

Figure 12:
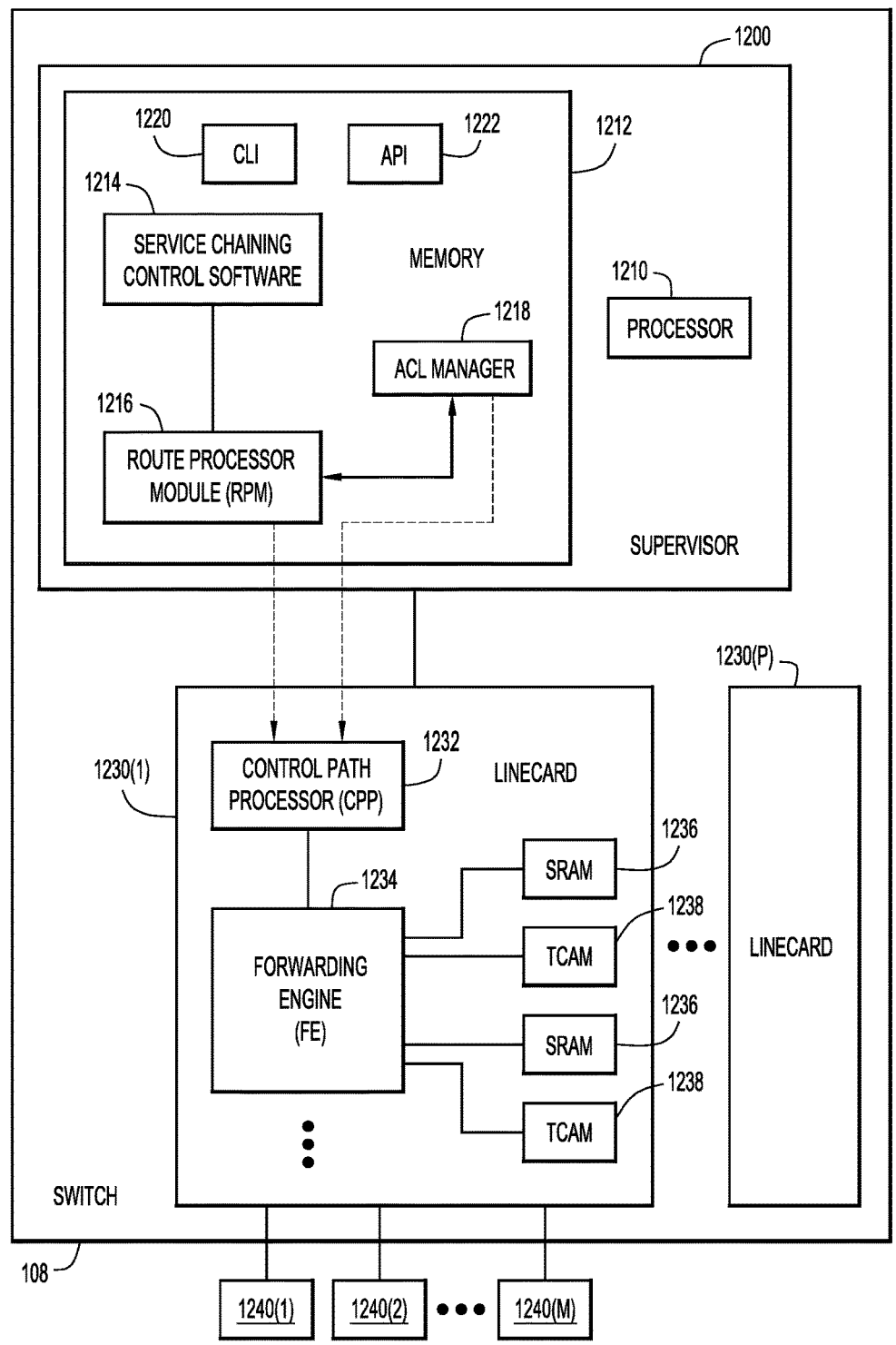
FIG. 12 is a diagram of the components of a network device that are configured to instantiate and configure a service chain on the network device, according to an example embodiment.

Reference is now made to FIG. 12. FIG. 12 is a block diagram of an example switch 108 configured for service chaining. The switch 108 includes a supervisor module 1200 and a plurality of linecards 1230(1)-1230(P). The supervisor module 1200 includes a processor (microprocessor or microcontroller) 1210 and memory 1212. The memory 1220 stores instructions for various software modules, including a service chaining module 1214, a Route Process Manager (RPM) 1216, an ACL manager 1218, a CLI 1220 and possibly an Application Programming Interface (API) 1222. The service chaining control software 1214 is configured to communicate with functions of the CLI 1220 or API 1222 to facilitate user configuration from outside of the switch 108. The RPM 1216 coordinates with the ACL manager 1218. The service chaining control software 1214, in cooperation with other components of the switch 108, performs the operations of aforementioned service chaining control function 126 described above in connection with FIGS. 2A-2C, 3A-3D, and 4.

The linecards 1230(1)-1230(P) each include a Control Path Processor (CPP) 1232 configured to program a plurality of Forwarding Engines (FEs) 1234, which may be implemented in hardware ASICs, for example. Each FE 1234 in a linecard is associated with respective Static Random Access Memories (SRAMs) 1236 and Ternary Content-Addressable Memories (TCAMs) 1238. Traffic enters to the switch at one of a plurality of network ports 1240(1)-1240(M) of a given linecard 1230(1)-1230(P), and leaves the switch via one of the plurality of network ports 1240(1)-1240(M) of a given linecard 1230(1)-1230(P).

The service chaining control software 1214 may be configured to perform selective traffic redirection based on ACL configuration, and may include the application specification module as shown in FIGS. 1-4. The service chaining control software may perform techniques described herein by controlling the RPM 1216 and ACL manager 1218 to configure the linecards 1230(1)-1230(P) by communicating with the CPP 1232 on each linecard. The CPP 1232 may program the FE 1234, and the FEs communicate with the TCAMs 1238, which store respective match ACLs, and the SRAMs 1236 store the action to be taken if there is a match (e.g., to which switch interface (to which an application is connected) to forward a network packet). The hardware entries described herein may be created in the TCAMs 1238 and/or SRAMs 1236 (or converted to TCAM and/or SRAM configurations).

Figure 13:
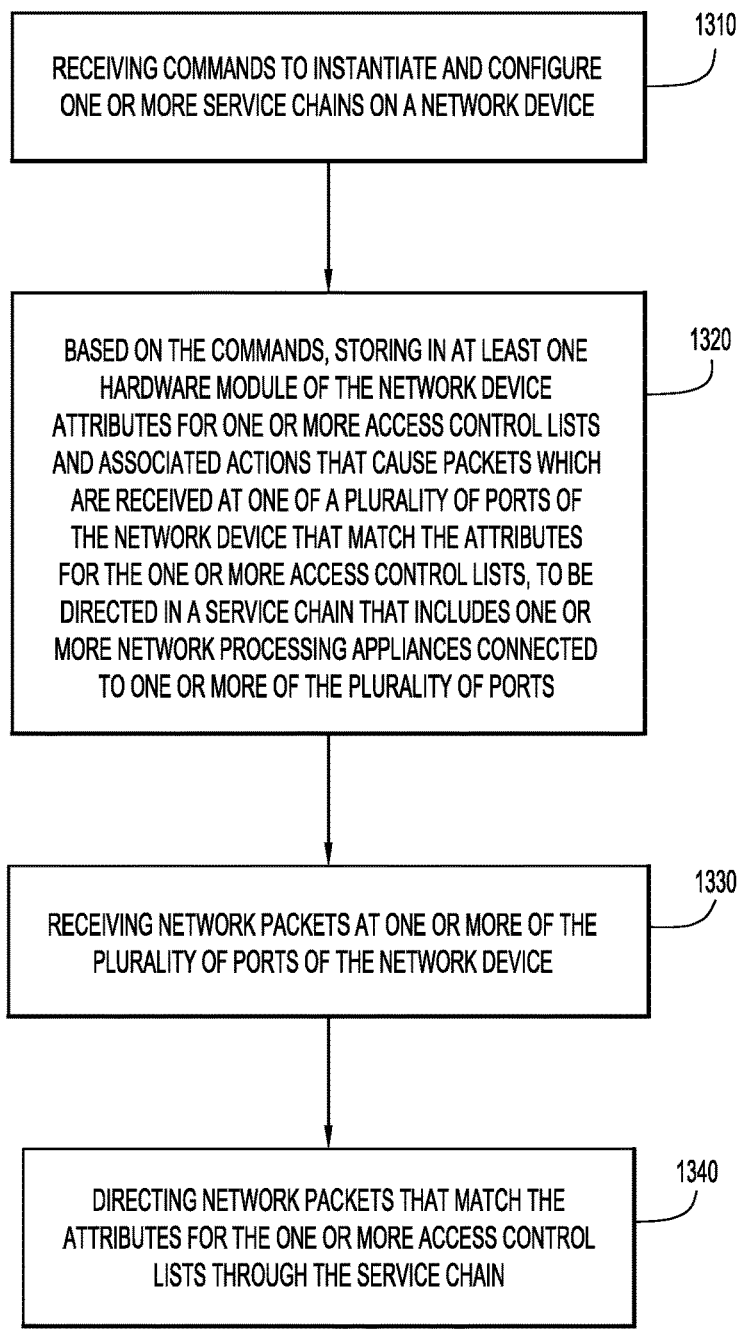
FIG. 13 is a flow chart depicting, with respect to FIG. 12, the operations to instantiate and configure a service chain on a network device, according to an example embodiment.

FIG. 13 illustrates a flow chart that depicts, at a high level, operations of a method 1300 for instantiating and configuring a service chain on a network device, in accordance with the embodiments presented herein. At 310, one or more commands are received at a network device to instantiate and configure one or more service chains on the network device. At 1320, based on the one or more commands, the network device stores in at least one hardware module of the network device attributes for one or more access control lists and associated actions that cause packets which are received at one of a plurality of ports of the network device that match the attributes for the one or more access control lists, to be directed in a service chain that includes one or more network processing appliances connected to one or more of the plurality of ports. At 1330, the network device receives network packets at one or more of the plurality of ports of the network device. At 1340, the network device directs network packets that match the attributes for the one or more access control lists through the service chain.

Operations 1320-1340 represent the core of the operations performed at the network device to enable the service chaining concepts presented herein.

As described above with respect to FIG. 2B, the storing operation 1320 may involve the network device storing in the at least one hardware module attributes to define one or more port groups, each port group specifying an egress port from the network device to a network processing appliance and an ingress port to the network device from the network processing appliance. In so doing, the network device directs network packets in the service chain in a Layer 2 mode without rewriting any information in the network packets.

As described above with respect to FIG. 3B, the storing operation may include storing in the at least one hardware module attributes to define one or more device groups, each device group specifying an Internet Protocol (IP) address of a network processing appliance. As a resulting, the network device directs network packets in the service chain in a Layer 3 mode by rewriting an address in the network packets.

Further still, as described above in connection with FIG. 4, the storing operation 1310 may involve storing in the at least one hardware module attributes to load balance network traffic packets among a plurality of network processing appliances that perform the same network processing function.

In summary, in one form, a network device is provided comprising: a plurality of ports at which network packets are received at the network device and sent from the network device; at least one hardware module coupled to the plurality of ports, wherein the at least hardware module includes one or more memories that store entries for one or more networking features to be performed to direct network packets with respect to the plurality of ports; and a processor coupled to the at least one hardware module and configured to communicate with the at least one hardware module to store in the one or more memories attributes for one or more access control lists and associated actions that cause network packets which are received that match the attributes for the one or more access control lists, to be directed in a service chain that includes one or more network processing appliances connected to one or more of the plurality of ports.

The processor may be configured to store in the one or more memories attributes to define one or more port groups, each port group specifying an egress port from the apparatus to a network processing appliance and an ingress port to the apparatus from the network processing appliance. The at least one hardware module may be configured to direct network packets in the service chain in a Layer 2 mode without rewriting any information in the network packets.

The processor may be configured to store in the one or more memories attributes to define one or more device groups, each device group specifying an Internet Protocol (IP) address of a network processing appliance. The at least one hardware module may be configured to direct network packets in the service chain in a Layer 3 mode by rewriting an address in the network packets in order to direct the network packets through the service chain.

The processor may be configured to store in the one or more memories attributes to load balance network packets among a plurality of network processing appliances that perform the same network processing function. Further still, the processor may be configured to execute instructions for receiving commands supplied externally from the apparatus to instantiate and configure one or more service chains on the apparatus.

In another form, a method is provided comprising: storing in at least one hardware module of a network device attributes for one or more access control lists and associated actions that cause packets which are received at one of a plurality of ports of the network device that match the attributes for the one or more access control lists, to be directed in a service chain that includes one or more network processing appliances connected to one or more of the plurality of ports; receiving network packets at one or more of the plurality of ports of the network device; and directing network packets that match the attributes for the one or more access control lists through the service chain.

In still another form, one or more non-transitory computer readable storage media are provided encoded with instructions that, when executed by a processor of a network device, cause the processor to: receive commands to instantiate and configure one or more service chains on the network device; and based on the commands, store in at least one hardware module of the network device attributes for one or more access control lists and associated actions that cause packets which are received at one of a plurality of ports of the network device that match the attributes for the one or more access control lists, to be directed in a service chain that includes one or more network processing appliances connected to one or more of the plurality of ports.

Note that with the example provided above, as well as numerous other examples provided herein, interaction may be described in terms of two, three, or four network elements. However, this has been done for purposes of clarity and example only. In certain cases, it may be easier to describe one or more of the functionalities of a given set of flows by only referencing a limited number of network elements. It should be appreciated that communication system 100 (and its teachings) are readily scalable and can accommodate a large number of components, as well as more complicated/sophisticated arrangements and configurations. Accordingly, the examples provided should not limit the scope or inhibit the broad teachings of communication system 100 as potentially applied to a myriad of other architectures.

It is also important to note that the steps in the preceding flow diagram illustrates only some of the possible signaling scenarios and patterns that may be executed by, or within, communication system 100. Some of these steps may be deleted or removed where appropriate, or these steps may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by communication system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain endpoint components and certain protocols, communication system 100 may be applicable to other protocols and arrangements. Along similar lines, communication system 100 can be extended to any communications involving network elements, where the present disclosure is explicitly not confined to unicasting and multicasting activities.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

The above description is intended by way of example only. Although the techniques are illustrated and described herein as embodied in one or more specific examples, it is nevertheless not intended to be limited to the details shown, since various modifications and structural changes may be made within the scope and range of equivalents of the claims.

What is claimed is:

1. An apparatus comprising:
a plurality of ports at which network packets are obtained at the apparatus and provided from the apparatus;
at least one hardware module coupled to the plurality of ports, wherein the at least one hardware module includes one or more memories that store entries for one or more networking features to be performed to direct the network packets with respect to the plurality of ports, wherein the at least one hardware module is configured to direct first one or more of the network packets having first one or more attributes for one or more access control lists in a service chain that includes one or more network processing appliances connected to one or more of the plurality of ports in a Layer 3 mode by rewriting one or more addresses in the first one or more of the network packets in order to direct the first one or more of the network packets in the service chain; and a processor coupled to the at least one hardware module and configured to communicate with the at least one hardware module to store in the one or more memories the first one or more attributes and associated actions that cause the first one or more of the network packets, to be directed in the service chain.

2. The apparatus of claim 1, wherein the processor is configured to store in the one or more memories second one or more attributes to define one or more port groups, each port group of the one or more port groups specifying an egress port from the apparatus to a network processing appliance of the one or more network processing appliances.

3. The apparatus of claim 2, wherein the at least one hardware module is configured to direct second one or more of the network packets in the service chain in a Layer 2 mode without rewriting any information in the second one or more of the network packets.

4. The apparatus of claim 1, wherein the first one or more attributes include one or more attributes to define one or more device groups, each device group of the one or more device groups specifying an Internet Protocol (IP) address of the one or more network processing appliances.

5. The apparatus of claim 1, wherein the processor is configured to store in the one or more memories second one or more attributes to load balance second one or more of the network packets among a plurality of the one or more network processing appliances that perform a same network processing function.

6. The apparatus of claim 1, wherein the processor is configured to execute instructions for receiving commands supplied externally from the apparatus to instantiate and configure the service chain on the apparatus.

7. The apparatus of claim 1, wherein the processor is configured to store in the one or more memories second one or more attributes to define one or more port groups, each port group of the one or more port groups specifying an ingress port to the apparatus from a network processing appliance of the one or more network processing appliances.

8. A method comprising:
storing in at least one hardware module of a network device first one or more attributes for one or more access control lists and associated actions that cause first one or more network packets which are obtained at one or more of a plurality of ports of the network device that match the first one or more attributes to be directed in a service chain that includes one or more network processing appliances connected to the one or more of the plurality of ports;
obtaining the first one or more network packets at the one or more of the plurality of ports of the network device; and
directing the first one or more network packets that match the first one or more attributes in the service chain in a Layer 3 mode by rewriting one or more addresses in the first one or more network packets in order to direct the first one or more network packets in the service chain.

9. The method of claim 8, wherein storing comprises storing in the at least one hardware module second one or more attributes to define one or more port groups, each port group of the one or more port groups specifying an egress port from the network device to a network processing appliance of the one or more network processing appliances.

10. The method of claim 9, wherein directing comprises directing second one or more network packets in the service chain in a Layer 2 mode without rewriting any information in the second one or more network packets.

11. The method of claim 8, wherein the first one or more attributes include one or more attributes to define one or more device groups, each device group of the one or more device groups specifying an Internet Protocol (IP) address of the one or more network processing appliances.

12. The method of claim 8, wherein storing comprises storing in the at least one hardware module second one or more attributes to load balance second one or more network traffic packets among a plurality of the one or more network processing appliances that perform a same network processing function.

13. The method of claim 8, further comprising obtaining commands supplied externally from the network device to instantiate and configure the service chain on the network device, and wherein storing is based on the commands.

14. The method of claim 8, wherein storing comprises storing in the at least one hardware module second one or more attributes to define one or more port groups, each port group of the one or more port groups specifying an ingress port to the network device from a network processing appliance of the one or more network processing appliances.

15. One or more non-transitory computer readable storage media encoded with instructions that, when executed by a processor of a network device, cause the processor to:
obtain commands to instantiate and configure one or more service chains on the network device; and
based on the commands, store in at least one hardware module of the network device first one or more attributes for one or more access control lists and associated actions that cause first one or more network packets which are obtained at one or more of a plurality of ports of the network device that match the first one or more attributes, to be directed in a service chain that includes one or more network processing appliances connected to one or more of the plurality of ports in a Layer 3 mode by rewriting one or more addresses in the first one or more network packets in order to direct the first one or more network packets in the service chain.

16. The one or more non-transitory computer readable storage media of claim 15, wherein the instructions that cause the processor to store, comprise instructions that cause the processor to store in the at least one hardware module second one or more attributes to define one or more port groups, each port group of the one or more port groups specifying an egress port from the network device to a network processing appliance of the one or more network processing appliances.

17. The one or more non-transitory computer readable storage media of claim 16, wherein the instructions that cause the processor to store, comprise instructions that cause the processor to store attributes that cause the at least one hardware module to direct second one or more network packets in the service chain in a Layer 2 mode without rewriting any information in the second one or more network packets.

18. The one or more non-transitory computer readable storage media of claim 15, wherein the first one or more attributes include one or more attributes to define one or more device groups, each device group of the one or more device groups specifying an Internet Protocol (IP) address of the one or more network processing appliances.

19. The one or more non-transitory computer readable storage media of claim 15, wherein the instructions that cause the processor to store, comprise instructions that cause the processor to store in the at least one hardware module second one or more attributes to load balance second one or more network packets among a plurality of the one or more network processing appliances that perform a same network processing function.

20. The one or more non-transitory computer readable storage media of claim 15, wherein the instructions that cause the processor to store, comprise instructions that cause the processor to store in the at least one hardware module second one or more attributes to define one or more port groups, each port group of the one or more port groups specifying an ingress port to the network device from a network processing appliance of the one or more network processing appliances.

* * * * *

UNITED STATES PATENT AND TRADEMARK OFFICE
CERTIFICATE OF CORRECTION

PATENT NO. : 10,476,790 B2
APPLICATION NO. : 15/825439
DATED : November 12, 2019
INVENTOR(S) : Samar Sharma et al.

It is certified that error appears in the above-identified patent and that said Letters Patent is hereby corrected as shown below:

In the Claims

Claim 1, Column 13, Lines 5 and 6, please replace "packets, to" with --packets to--

Claim 12, Column 14, Line 9, please replace "traffic packets" with --packets--

Claim 15, Column 14, Line 33, please replace "attributes, to" with --attributes to--

Signed and Sealed this
Eighteenth Day of February, 2020

Andrei Iancu
*Director of the United States Patent and Trademark Office*